(12) United States Patent
Shuster et al.

(10) Patent No.: US 8,775,396 B2
(45) Date of Patent: Jul. 8, 2014

(54) METHOD AND SYSTEM FOR SEARCHING A WIDE AREA NETWORK

(75) Inventors: Brian Mark Shuster, Stateline, NV (US); Gary Stephen Shuster, Oakland, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 86 days.

(21) Appl. No.: 13/154,251

(22) Filed: Jun. 6, 2011

(65) Prior Publication Data

US 2011/0238662 A1 Sep. 29, 2011

Related U.S. Application Data

(63) Continuation of application No. 09/548,803, filed on Apr. 14, 2000.

(60) Provisional application No. 60/129,448, filed on Apr. 15, 1999.

(51) Int. Cl.
*G06F 17/30* (2006.01)

(52) U.S. Cl.
USPC .......................................... 707/705; 707/706

(58) Field of Classification Search
USPC ................................. 707/732, 733, 734, 748
See application file for complete search history.

(56) References Cited

U.S. PATENT DOCUMENTS

| 5,500,920 | A | | 3/1996 | Kupiec |
|---|---|---|---|---|
| 5,515,488 | A | | 5/1996 | Hoppe et al. |
| 5,642,502 | A | | 6/1997 | Driscoll |
| 5,754,938 | A | | 5/1998 | Herz et al. |
| 5,794,237 | A | | 8/1998 | Gore, Jr. |
| 5,806,061 | A | | 9/1998 | Chaudhuri et al. |
| 5,855,015 | A | | 12/1998 | Shoham |
| 5,864,845 | A | | 1/1999 | Voorhees et al. |
| 6,006,218 | A | | 12/1999 | Breese et al. |
| 6,006,225 | A | | 12/1999 | Bowman et al. |
| 6,025,837 | A | | 2/2000 | Matthews et al. |
| 6,154,737 | A | * | 11/2000 | Inaba et al. .................... 707/696 |
| 6,314,420 | B1 | | 11/2001 | Lang et al. |
| 6,334,110 | B1 | * | 12/2001 | Walter et al. ................ 705/14.41 |
| 6,356,899 | B1 | | 3/2002 | Chakrabarti et al. |
| 6,363,378 | B1 | | 3/2002 | Conklin et al. |
| 6,385,620 | B1 | | 5/2002 | Kurzius et al. |
| 6,397,212 | B1 | * | 5/2002 | Biffar ............................ 707/704 |
| 2004/0064417 | A1 | * | 4/2004 | Stefik et al. ..................... 705/52 |
| 2007/0083507 | A1 | * | 4/2007 | Bowman et al. .................. 707/5 |

\* cited by examiner

*Primary Examiner* — Baoquoc N To

(57) ABSTRACT

A method and system for searching a wide area network that enables users to find the information they seek more quickly and more easily than prior art search engines are disclosed. Aspects of this disclosure include a process for making use of a user's prior search queries for query definition; a process for similarly making use of prior search queries by other users; a process for expanding and clarifying the meaning of queries; a process for including paid and other preferred results in an overall query result; and a process for using user evaluation data from previous search query results to identify results that should be included or removed from a current result.

17 Claims, 12 Drawing Sheets

FIG. 1
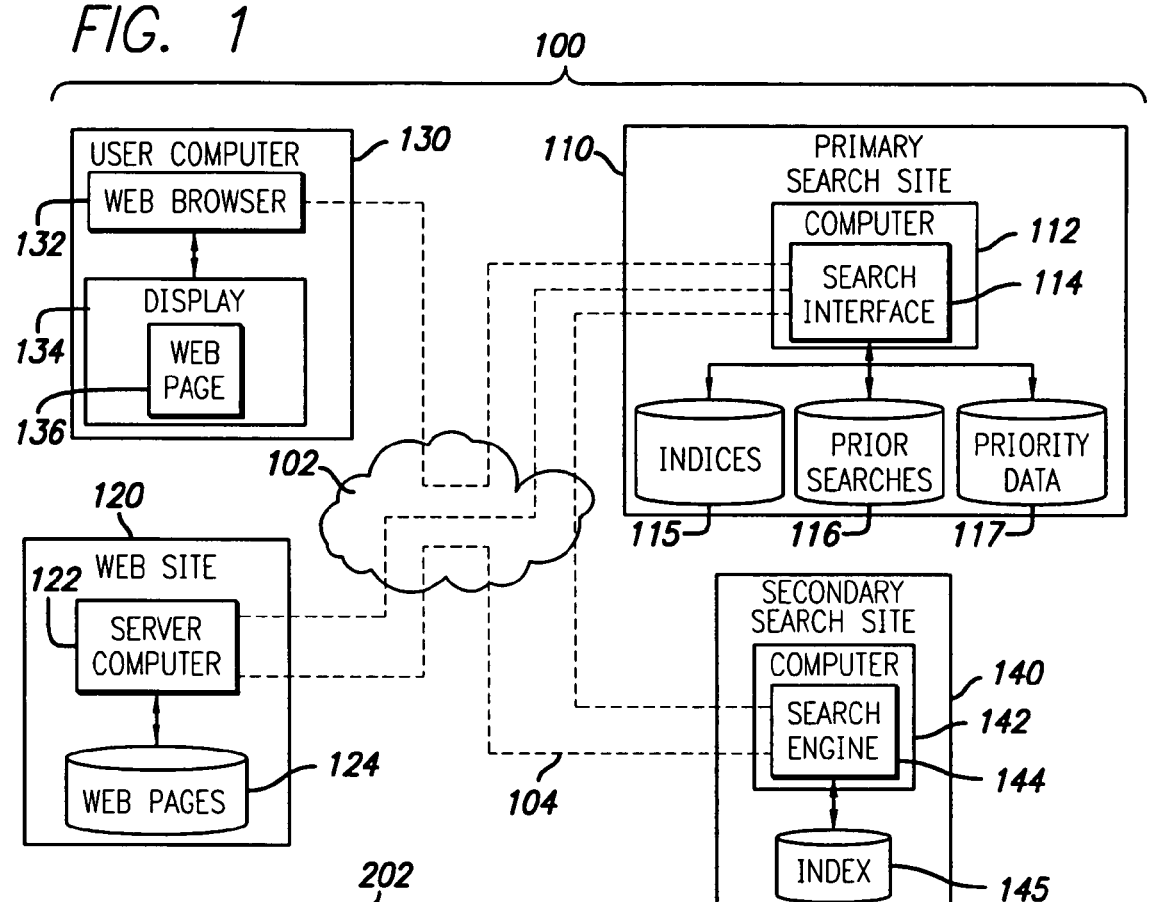
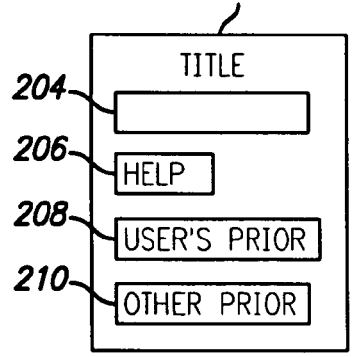
FIG. 2A
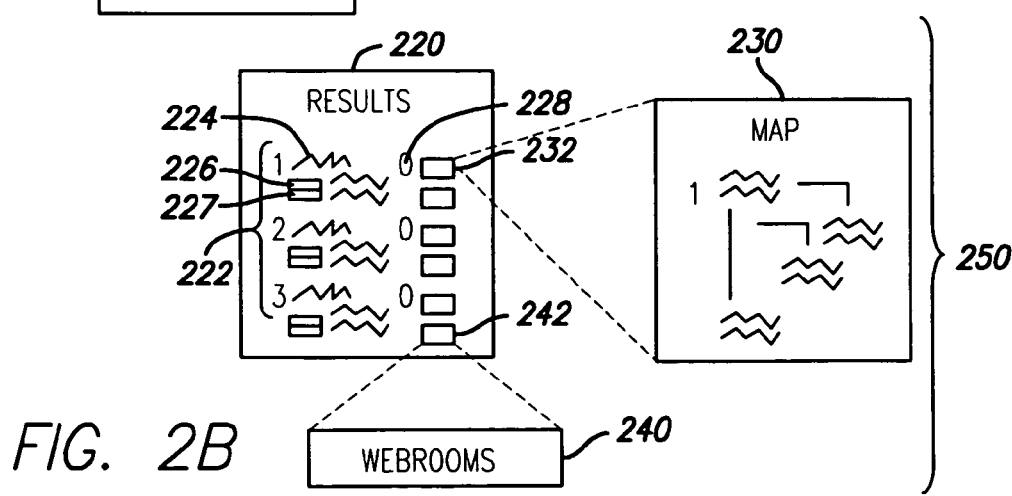
FIG. 2B

METHOD AND SYSTEM FOR SEARCHING A WIDE AREA NETWORK

CROSS-REFERENCE TO RELATED APPLICATIONS

This application is a continuation of U.S. patent application Ser. No. 09/548,803, filed on Apr. 14, 2000, which claims priority pursuant to 35 U.S.C. §119(e) to U.S. provisional application Ser. No. 60/129,448, filed Apr. 15, 1999, all of which are specifically incorporated herein, in their entirety, by reference.

BACKGROUND OF THE INVENTION

1. Field of the Invention

The present invention relates to locating and organizing information on a wide area computer network such as the Internet, and more particularly, to a method and system for performing a user-specified search of information on the Internet, and for creating search result pages.

2. Description of the Related Art

The amount and variety of information accessible on the Internet, and in particular, through the World Wide Web, is now extremely vast and continues to grow very rapidly. At the same time, as the Internet grows in popularity, quickly locating useful and accurate information on the Internet is becoming both more important and more difficult.

Various methods, such as employed by search engines and Internet directories, have been developed to help Internet users locate information. Search engines and Internet directories are typically accessible through Web sites. Some Web sites provide access to multiple search engines, or to combinations of search engines and directories. Although they operate differently, search engines and directories all deliver their information in a similar format i.e., as a list of URL's for selected websites (commonly called "hits"), organized by category and/or by search query. Typically, each hit is presented as a hyperlink on a HyperText Mark-up Language (HTML) results page produced by the search engine or directory. Such results pages may list other information about each hit, such as the Web site Meta Tags, and rank the hits using a variety of ranking algorithms.

Search engines are capable of locating information from a large set of Web pages, but frequently at the cost of making it more difficult to locate the most relevant information. A typical search engine utilizes a database containing an enormous, frequently updated index of Web pages. The database is maintained and updated using an automated or semi-automated process relying on a variety of indexing, searching, and ranking algorithms. The operation of various search algorithms are known, and it is not uncommon for Web page authors to deliberately design pages in a manner that boosts the likelihood of being selected by a search engine as highly relevant to a particular topic, when the actual information content of the page pertaining to the topic is poor or even completely irrelevant. Also, many Web pages that are not deliberately designed to be selected by a searching algorithm are nonetheless selected inappropriately for other reasons. For example, a search for a word having multiple meanings will retrieve results for all of the meanings, although results for only a single meaning are usually desired. Perhaps even more frequently, pages with many of the query keywords nonetheless have little useful information. Thus, because of the enormous size of the search engines' databases, and the limitations of the algorithms employed by them, search engines often provide a large quantity of useless or irrelevant information. It is often very time-consuming for a user to evaluate and discard the many useless results that are returned.

In contrast, Internet directories are typically maintained and updated mostly by human operators. Such operators are employed by the operator of the directory for this purpose. This approach frequently permits a user to locate a relevant Web site more quickly than using a search engine, but it has the drawback of greatly limiting the scope of the search. Because of the enormous size of the Internet and frequent changes in its information content, it would be far too costly to employ a staff large enough to organize any substantial portion of Internet Web pages into a directory. And, even if such an effort were economically feasible, it is quite likely that any resulting directory would be so large that it would be difficult and time-consuming to navigate. Thus, Internet directories allow a user to locate information more quickly, but only if the information is located on a very limited set of Web pages.

Thus, there exists a need for a method and system for searching a wide area network, that overcomes the limitations of prior art search engines and directories as summarized above.

SUMMARY OF THE INVENTION

The present invention provides a method and system for searching a wide area network that enables users to find the information they seek more quickly and more easily than prior art search engines, while not limiting the scope of searched information as do Internet directories. The method and system of the present invention makes use of automated and semi-automated, publicly available search engines. In the alternative, dedicated search engines may be used. The present invention provides an interface employing a collection of innovative processes for searching a wide area network, that makes use of information provided by such search engines. Each of these innovative processes, and various combinations of them, can be included in different embodiments of the present invention to improve the process of searching a wide area network.

In an embodiment of the invention, a search query definition method is provided that includes a process for making use of a user's prior search queries. The process enables a user to repeat past searches that have returned desired results, saving the user from having to re-formulate a search. In an alternative embodiment, the search definition method includes a process for making use of prior search queries by other users of the search interface. Upon entering search terms, a user is presented with a list of similar search queries performed by other users, which preferably includes certain information about each prior search, such as the number of times it has been performed by the system, and the search effectiveness. A user then selects one or more of the prior search queries to perform, and/or modifies one or more prior queries to formulate one or more new queries.

In another embodiment of the invention, a search query expansion method is provided that includes a process for adding terms to the query that have meanings equivalent or similar to terms already in the query. This method is particularly useful if a search term has more than one meaning. In such cases, the search query is more likely to be effective if the user adds additional terms that have meanings equivalent or similar to the intended meaning.

In another embodiment of the invention, a query execution method is provided that includes a process for identifying Web pages for which a subscriber has paid to be returned by search queries having particular terms, referred to as "paid placement." Paid placement provides a way to generate revenue to offset the cost of operating a search site, and in this way it benefits Web site users. To an advertiser, paid placement provides a way to do targeted advertising with a high likelihood of being read by the recipient. That is, by entering a particular query, the recipient has signaled an interest in reading material about a particular topic, perhaps including an interest in informative advertising and/or offers to sell related products or services.

In another embodiment, the query execution method includes a process for identifying Web pages that a host desires to be returned by search queries having particular terms, referred to as "host preferences." Host preferences provide a way for the web host to take advantage of the benefits provided by paid placement. For example, the host may want to offer certain products or services for sale using host preferences, and in this way defray the cost of hosting the search site.

In another embodiment, the query execution method includes a process for using user evaluation data from previous search query results to identify Web sites that should be included or removed from a current search executed using the same or similar query. This provides a user with the benefit of the experience of past users of the query, and past system data concerning the query results. The query method further includes a process for executing the selected search query, or set of queries, on one or more search engines; collecting the search results; combining the search results with any paid placements, host preferences, or prior recommended results; removing any duplicate results; and generating a top results list.

In another embodiment, a results screening and ranking method is provided that includes a process for removing subordinate pages from a search result. A subordinate page is a Web page on the same Web site as a higher-level Web page, wherein the subordinate page may be accessed by following one or more links on, or a chain of links originating on, the higher-level page. Typically, higher-level pages are designed to serve as a portal or access page for a set of subordinate pages on the same Web site. Thus, removing subordinate pages is a way of removing essentially duplicate and unnecessary results, while retaining the higher-level result. This reduces clutter in a search result and makes it easier to identify useful Web pages.

In another embodiment, the results screening and ranking method includes a process for testing Web pages that appear on a search result, and removing or flagging pages which are unresponsive or slow to respond. This testing process prevents users from wasting time attempting to load Web pages that are obsolete, located on Web sites with unresponsive or slow servers, or otherwise restricted. Users are then free to spend more time evaluating Web pages that are more readily accessible.

In another embodiment, the present invention provides a method for generating results pages that includes a process for ranking search results by applying a set of ranking factors, including, for example, paid placement, host preferences, page response time, order received from search engine, identity of search engine, and user evaluation data. The ranking process is used to ensure that the higher-ranked and most useful pages receive more prominent placement in any search result pages viewed by the user.

In another embodiment, the method for generating results pages includes a pre-caching process for caching Web pages linked to search results pages, before the Web pages are requested by the user. The pre-caching process enables the user to view the pages returned by a search result more quickly. Also, the user may browse the cached pages off-line, creating a convenient option when a network connection is unavailable, for example, when traveling on an airplane. Preferably, the pre-caching process uses a set of user-determinable and system-determinable parameters to determine which Web pages to cache.

In another embodiment, the method for generating results pages includes a process for providing links to a set of related information exchange groups, preferably Webrooms. A Webroom is an information exchange group, further described in the co-pending application entitled "A Method, Apparatus and System for Hosting Information Exchange Groups on a Wide Area Network," filed on Aug. 21, 2000, Ser. No. 09/648,474, which application is specifically incorporated herein by reference, and in the detailed description below. A Webroom provides a convenient and highly interactive way for multiple users to exchange information over a wide area network. The process for providing links to related Webrooms provides users with an additional source of topic-specific information and the opportunity to interact with other users interested in the topic.

In another embodiment, the method for generating results pages includes a process for providing a set of Web maps for Web pages identified in the search results. A Web map is a Web page that contains summary information about the content and hyperlinks found on a target Web page and on other Web pages linked to the target page. Web maps are further described in the co-pending application entitled "A Method and Apparatus for Mapping a Site Page on a Wide Area Network," filed on Apr. 14, 2000, Ser. No. 09/549,505, which application is specifically incorporated herein by reference, and in the detailed description below.

In another embodiment, a method for integrating user data is provided that includes a process for recording user evaluation of the content and usefulness of the Web pages provided by a search. In one embodiment, user data is collected by presenting users with a "vote" button, or series of vote buttons, on a results screen. Web pages are ranked by a tallying of positive and negative votes; by an average of numeric scores assigned by users, and similar methods. User evaluation data is used by the system to rank search results, by users to select pages for viewing, and by Web page authors to evaluate user satisfaction with their pages. In another embodiment, user data, such as the length of time a user views a particular Web page or the number of pages viewed on a particular Web site, is collected and recorded without the active participation of the user.

In general, many of the exemplary methods and processes described above make use of user-provided data concerning the system, such as search query effectiveness and the relative usefulness and relevance of particular Web sites and Web pages. Also, many of the processes exemplify the use of performance data that is automatically collected without direct user participation, such as Web site response time. This gathering of user and system data is an important facet of the present invention. Such processes for collecting data about system performance essentially provide a feedback loop that greatly enhances the performance of the system. Unlike prior art methods, the searching method of the present invention is able to respond to growth in available data and growth in use by providing more focused and relevant search results. The continuous user and system feedback makes the system perform better as it is used more; and the better the system performs, the more likely it is to be used. Thus, a system according to the present invention promotes itself via a network effect, making it useful for any application intended to draw large numbers of users, such as an Internet portal Web site or other electronic commerce site.

In addition to the methods described above, a computer-implemented system for performing a method according to various embodiments of the invention is also provided. The system, also referred to as an apparatus, includes a user computer connected to a network and having a browser application, and a primary search server computer connected to the network. The primary search server further comprises a database and an application for providing an interface and performing the search methods according to an embodiment of the invention. The system preferably includes one or more secondary servers connected to the network and one or more Web servers containing Web pages and other information available to the user computer. Users perform a search by accessing the primary search server using a browser application residing on a user computer. Search methods according to the present invention are performed by software residing on the primary search server, or on other servers on the wide area network that are accessible to the primary search server. After a search is completed, results pages are delivered to users' computers for viewing on the browser application.

A more complete understanding of the method and system for a search engine for use on a wide area network will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a block diagram illustrating a system for searching a wide area network according to the present invention;

FIGS. 2A, 2B, and 2C are diagrams illustrating visual elements of exemplary Web pages displaying search results according to the invention;

DETAILED DESCRIPTION OF THE PREFERRED EMBODIMENT

Figure 2C:
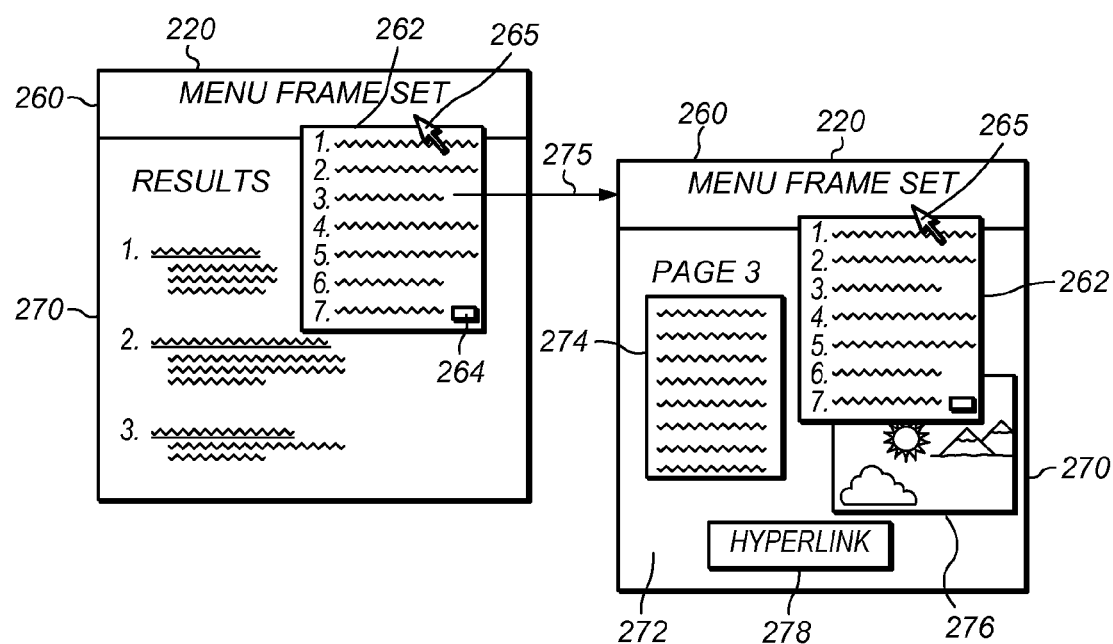

The present invention satisfies the need for a method and system for searching a wide area network, that overcomes the limitations of prior art search engines and directories. In the detailed description that follows, like element numerals are used to describe like elements illustrated in one or more figures. Various terms and acronyms are used throughout the detailed description, including the following:

Application. Within the context of computer hardware and software, an application is a set of one or more computer programs that performs a function when executed within a computer hardware device. If the set is comprised of plural programs, the programs are coordinated to perform a function together; such programs may also perform other functions individually. Similarly, a program may be comprised of plural modules that perform certain functions individually and other functions when combined in various ways.

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user. The program which responds to browser requests by serving Web pages is commonly referred to as a "Web server."

Cookies. A technology that enables a Web server to retrieve information from a user's computer that reveals prior browsing activities of the user. The information item is stored on the user's computer (typically on the hard drive) is commonly referred to as a "cookie." Many standard Web browsers support the use of cookies.

Distributable application. An application coded in a language, such as the JAVA language developed by Sun Microsystems, Inc., such that the application may be distributed over a wide area network, such as the Internet, and be successfully executed on a variety of computer hardware models running various operating systems.

Hyperlink. A navigational link from one document to another, or from one portion (or component) of a document to another. Typically, a hyperlink is displayed as a highlighted word or phrase that can be selected by clicking on it using a mouse or other pointing device to jump to the associated document or documented portion.

Hypertext System. A computer-based informational system in which documents other types of computer files are linked together via hyperlinks forming a user-navigable "web."

Information Exchange Group. A general term encompassing a particular set of protocols or rules for information sharing, together with a particular set of shared information or data collected or generated under the associated rules and protocols, and the users (or other sources) contributing information to, or accessing information in, the shared set of information. As implemented on the Web, information exchange groups include newsgroups, bulletin boards, message boards, chat rooms, and "Webrooms." Webrooms are further described in the detailed description below, and in the co-pending application referenced therein.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ('Web"). Used herein to refer generally to both (i) a distributed collection of interlinked, user-viewable Web pages and other linked data and distributable applications that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Page. A hypertext file or document that is encoded using a language such as HTML for viewing on a client computer using a browser application. A Web page may include visible components, such as text, images, hyperlinks, and a background, and/or invisible components, such as meta tags and formatting instructions. In comparison to the term "Web page," the more general term "page" encompasses many other types of computer files that are not necessarily encoded for viewing using a browser, e.g., text files, bit-maps, audio files, and so forth.

Web Site. A computer system that serves informational content over a network using the standard protocols of the World Wide Web. Typically, a Web site corresponds to a particular Internet domain name, such as "electronsearch.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 2.0 is currently the primary standard used for generating Web documents, although it should be appreciated that other coding conventions could be used within the scope of the present invention.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

HTTP (HyperText Transport Protocol). The standard World Wide Web client-server protocol used for the exchange of information (such as HTML documents, and client requests for such documents) between a browser and a Web server. HTTP includes a number of different types of messages that can be sent from the client to the server to request different types of server actions. For example, a 'GET' message, which has the format GET <URL>, causes the server to return the document or file located at the specified URL.

URL (Uniform Resource Locator). A unique address which fully specifies the location of a file or other resource on the Internet. The general format of a URL is protocol://machine address:port/path/filename. The port specification is optional, and if no port-is specified, the browser defaults to the standard port for whatever service is specified as the protocol.

The foregoing definitions are not intended to limit the scope of the present invention, but rather are intended to clarify terms that are well understood by persons having ordinary skill in the art. It should be appreciated that the defined terms may also have other meanings to such persons having ordinary skill in the art. These and other terms are used in the detailed description below.

Referring to FIG. 1, a block diagram is illustrated of a wide area network employing a search method and system according to the invention. It is anticipated that the present information delivery system 100 operates with a plurality of computers which are coupled together on a wide area network, such as the Internet 102, or other communications network. FIG. 1 depicts a network that includes a user computer 130 that communicates with a primary search site 110 though communication links 104 that include the Internet 102. The network further includes a Web site 120 and a secondary search site 140, each of which communicates with each other, with user computer 130, and with primary search site 110. The user computer 130 may be any type of computing device that allows a user to interactively browse websites, such as a personal computer (PC) that includes a Web browser 132 (e.g., Microsoft Internet Explorer™ or Netscape Communicator™). Suitable user computers 130 equipped with browsers 132 are available in many configurations, including handheld devices (e.g., PalmPilot™) personal computers (PC), laptop computers, workstations, television set-top devices, multi-functional cellular phones, and so forth. The primary search site 110 includes a search server computer 112 running search interface application 114 and capable of selectively delivering data files, such as HTML files, to the user computer 130 using a protocol, such as HTTP. Search interface 114 optionally has search engine capability. Search interface 114 uses various databases, such as Internet index 115, prior searches database 116, and ranking database 117 while performing functions according to the present invention. Secondary search site 140 includes a search server computer 142 running a search engine 144 and a database such as Internet index 145. Typically, search interface 114 and search engine 144 are applications coded in various programming languages, such as C or C++, and are customized to run on their respective servers 112 and 142. Search engines, such as 144, typically incorporate a database engine, such as a SQL Server™ engine from Microsoft Corporation or Oracle™ database engine, as part of their architecture. Search engines typically perform searches by operating on a string of characters, known as a "query string." A query string is coded according to a set of rules determined by the database engine and/or a user interface between the database engine and the user. As used herein, a "query" is broader than a "query string," denoting both the query string and the search logic represented by the query string, whereas "query string" refers only to a string of characters, symbols, or codes used to define a query.

Web site 120 includes Web server 122 and accesses a database of Web pages 124, distributable applications, and other electronic files containing information of various types. Web pages 124 may be viewed on display 134 of user computer 130; for example, Web page 136, other electronic files may be viewed on display 134 by a suitable application program residing on user computer 130, such as browser 132, or by a distributable application provided to user computer 130 by Web server 122. It should be appreciated that many different user computers, many different Web servers, and many different search servers of various types may be communicating with each other at the same time.

The present invention allows a user to locate Web pages and other files containing information pertaining to any particular query, referred to as "relevant pages." Relevant pages are located on one or more Web sites connected together through links including the Internet 102. Furthermore, the invention permits a user to search a substantial portion of all Web sites that are connected to the Internet, and assists the user in locating the most relevant pages from a multiplicity of relevant pages in various ways.

Web pages are generally requested by communicating an HTTP request from the browser application 132. The HTTP request includes the Uniform Resource Locator (URL) of the desired Web page, which may correspond to a Web page 124 stored at a destination Web site, such as primary search site 110. The HTTP request is routed to the Web server 122 via the Internet 102. The Web server 122 then retrieves the requested Web page, identified by a URL, from database 124. and communicates the Web page across the Internet 102 to the browser application 132. The Web page may be communicated in the form of plural message packets as defined by standard protocols, such as the Transport Control Protocol/Internet Protocol (TCP/IP), although it should be appreciated that communication using other protocols would be within the scope of the invention.

Schematic diagrams exemplary of the visual organization of various Web pages viewed during a performance of one embodiment of the invention are provided in FIGS. 2A and 2B. Referring now to FIG. 2A, a search for relevant pages is initiated when a user connects with primary Web site 110 using user computer 130, and requests a search definition page, for example, page 202, from search server computer 112. Search definition page 202 comprises a Web page that preferably includes a search query entry field 204, a hyperlink to general help with query formulation 206, a hyperlink to a Web page 208 providing access to the user's prior searches, and a hyperlink to a Web page 210 providing access to prior searches from other users. Various other information and graphical displays as known in the art (not depicted in FIG. 2A) are preferably included on or linked to the search definition page 202; including, for example, Web site identification information, such as logos, service marks, and trademarks, graphics creating a pleasing user interface, advertising banners, an exit link, and a user welcoming statement.

After entering and refining one or more search queries using search entry page 202 and the methods that are described below, the user sends the query or queries to primary search server 112. Using its search interface 114, search server 112 performs a search and operates on the search results according to the method and processes described below. Search interface application 114 is comprised of a program, or a plurality of cooperating programs, which perform functions according to the present invention. In performing the search and subsequent operations, primary search site 110 preferably communicates with one or more secondary search sites, such as secondary search site 140, and one or more Web sites, such as Web site 120.

Referring now to FIG. 2B, the operations performed by primary search server 112 include generating one or more Web pages 250 that contain various summaries of the search results, referred to as "results pages." Results pages 250 preferably include a first page 220, map pages 230, Webroom pages 240, and hyperlinks 222 to the relevant pages identified by the search interface 114. Results pages 250 further preferably include interactive fields for collecting user data, such as voting button 226 and scoring field 227. Interactive fields are preferably created using HTML, or a distributable application programming language such as JAVA. A user interacts with an interactive field by pointing, clicking, dragging, and performing similar operations with a mouse or similar pointing device, or by using a computer keyboard, or by using any other device that provides for input into a computer which is linked to the interactive field.

Hyperlinks 222 include links 224 directly to the relevant pages located at one or more Web sites anywhere on the Internet, and/or links 228 to copies of the relevant pages that have been cached on a network server, preferably the primary search server 112, or on user computer 130, during post-search operations by search interface 114. Hyperlinks 222 further preferably include links 232 to map pages 230, and links 242 to Webroom pages 240, or less preferably, to other information exchange groups. The organization of map pages 230 and Webroom pages 240 are described in more detail below, in conjunction with a description of the methods used to generate them.

Referring now to FIG. 2C, in an embodiment of the invention, result page 220 comprises menu frame set 260 and results frame set 270. By issuing a command to the browser using a suitable input method, such as a keystroke, or preferably, by moving cursor 265 inside of menu frame set 260 using a pointing device, a user causes menu 262 to appear. Menu 262 is preferably displayed inside of a "pull-down" or "pop-up" window that appears when the user issues a designated command. Menu 262 provides a list summarizing the results list. For example, the menu list may contain the titles of the top ten search results, and a "more" button 264. By selecting button 264, for example, by moving the cursor to button 264 and clicking using a pointing device, the user causes the next ten search results to appear in the menu list. Items in the menu list are preferably interactive, so that selecting an item in the list causes a linked relevant page to be displayed in the results frame set 270, as indicated by arrow 275. For example, if the third item in menu 262 is selected, the third relevant page 272, containing text block 274 and graphic 276, appears in results frame set 270. Meanwhile, menu frame set 260 continues to appear and menu 262 continues to be accessible from frame set 260. Furthermore, menu frame set 260 and menu 262 remain accessible if the user views pages linked to any page displayed in frame set 270, for example, if the user opens another page by selecting hyperlink 278. Accordingly, the user is provided with a rapidly accessible, or ever-present, menu list of search results while reviewing a multiplicity of relevant pages. Unlike prior art methods, there is no need to refer to the original results page to explore all pages on the results list. Thus the user is provided with a much more convenient means of reviewing multiple search results than provided by prior art methods.

Primary search server 112 sends results pages 250 to user computer 130, allowing the results pages to be viewed by a user on display 134. Preferably, results pages 250 include interactive fields for collecting the user's opinion of the usefulness and relevance of the search results, such as vote button 226 and scoring field 227. User opinions are collected with the active participation of the user, and hence are referred to as "active data." Additionally, primary search server optionally sends commands, embedded in files such as cookies or Web pages, and encoded in languages such as HTML and Java, to the user computer 130 which collect information about the user's interaction with the results pages and relevant results. Such information is preferably collected without active participation by the user, and hence is referred to as "passive data." Passive data is preferably collected with the user's consent, which may be obtained at any time before, after, or during a search process. Active data and passive data are transmitted to the primary search server 112 and collected in one or more databases for future use, thereby concluding a search cycle. The cycle is repeated at the option of the user by initiating another search as described above.

Figure 3:
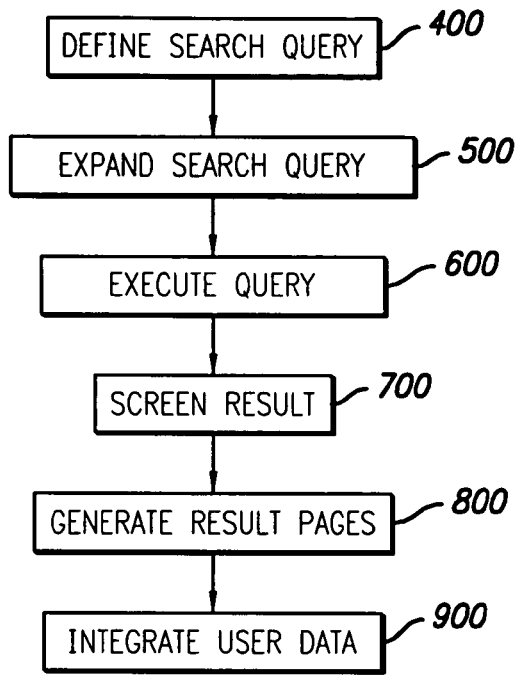
FIG. 3 is a flow chart showing an overview of the steps for performing the method of searching a wide area network.

Referring now to FIG. 3, a flow chart illustrates exemplary operation of the search interface 114 in accordance with the foregoing description of the invention. A search is initiated in a search query definition method 400. In an embodiment of the invention, a method for expanding the search query 500 is provided. The query, including any expanded terms, is then executed using query execution method 600, wherein query results are provided. In an embodiment of the invention, query results are then screened using results screening method 700. Result Web pages are then generated using a page generation method 800, for user viewing of the query results. Preferably, a method for integrating user data 900 into the system is applied, for use by search interface 114. Further details about the methods illustrated in FIG. 3 are provided in the description below.

Figure 4:
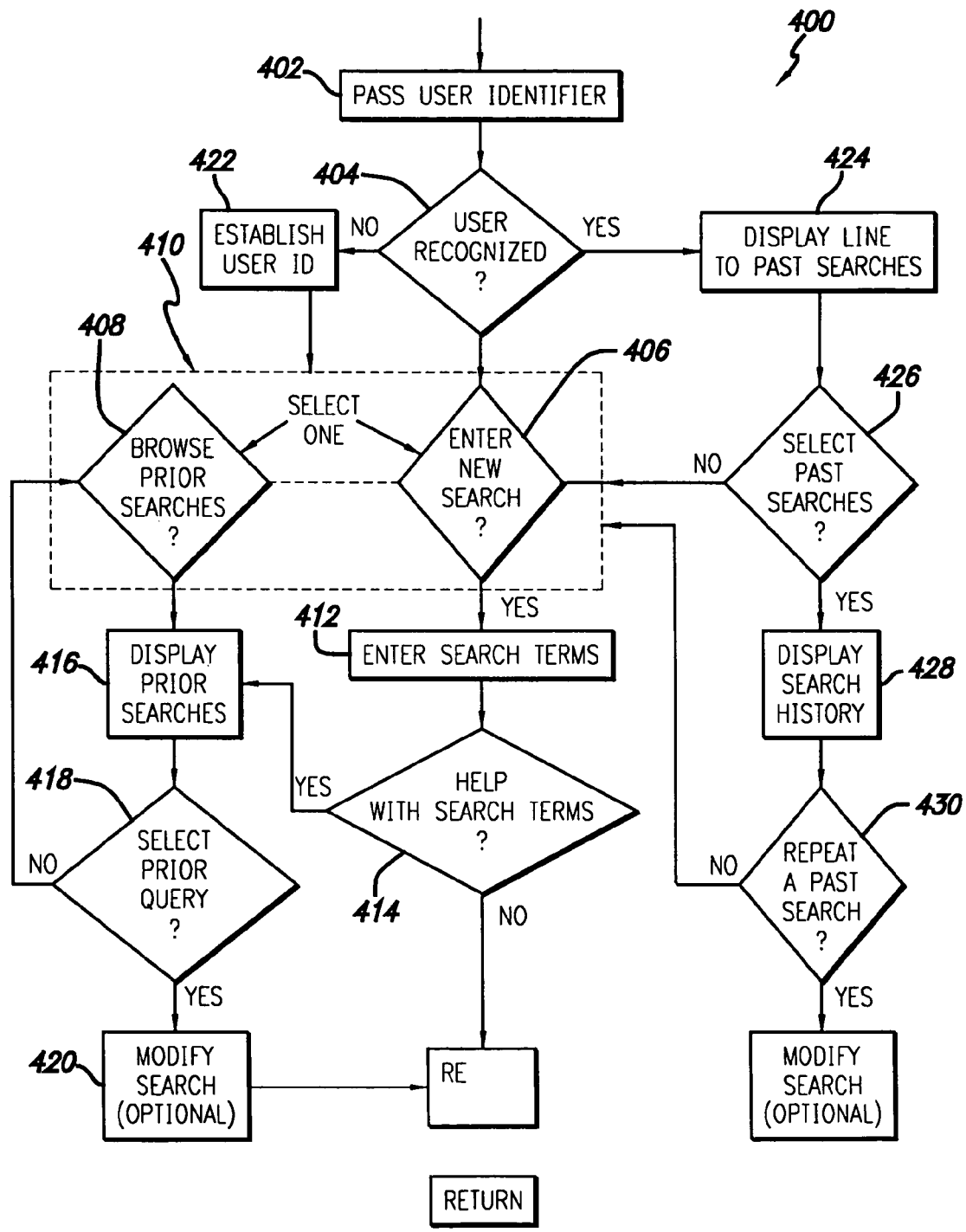
FIG. 4 is a flow chart showing further steps and processes embodied in the search query definition method, including processes for using prior searches by the user, and prior searches by other users.

In an embodiment of the invention, method 400 includes steps and processes described below with respect to FIG. 4. In one embodiment, method 400 includes a process for making use of a user's prior search queries. At step 402, a user identifier ("ID") is passed to the primary search server. The user identifier may be obtained from a cookie placed on the user computer during a prior search, or by a login process requesting a user ID, such as a user name or password. At step 404, the server determines whether the user ID is recognized by comparing it to a database of prior user ID's. If the user ID is not recognized, a user ID is preferably established in step 422. A user ID can be established by various processes, including, for example, a user registration process or by sending a cookie to the user computer. After a user ID is established, a menu 410 is displayed, offering a selection of options to the user; for example, the options displayed at steps 406 and 408 (described below). Menu 410 preferably appears as a search entry page 202, described above in connection with FIG. 2A.

If the user ID is recognized, a link to the user's past search queries is displayed at step 424. If the user does not select the link at step 424, the user is presented with a menu as described above, at step 410. The menu presented at step 410 is preferably a home page with various menus, links, and advertising placements for generating revenue. If the user selects the link displayed at step 424, the user's prior search queries are displayed at step 428. Preferably, the user's prior queries are displayed in an order ranked by one or more settable criteria, including, for example, the age of the query and a user-determined effectiveness rating. At step 430, the user is presented with the option to repeat one or more past search queries. Prior search engines have not provided this option, requiring users to reformulate their searches or save them in some other manner. Because effective searches can take time to formulate, and users are frequently interested in repeating a search, providing access to the user's prior searches can save a substantial amount of the user's time. At step 430, if the user selects a prior query, or a portion of the query string from a prior query, the prior query string or portion thereof becomes part of the current query. Preferably, the user may modify the prior query string by removing or adding search terms and modifiers, or adding new terms and modifiers at step 432. At step 434, the query is recorded in a query string database for use by the search engine. If the user does not select a prior query, then the user is presented with options by menu 410.

Within the menu 410, the user may select to enter a new query at step 406, or browse past searches by other users at step 408. If a new query is selected at step 406, the user enters search terms into an interactive search entry screen at step 412. At step 414, the user may request help in formulating a search. If the user requests help, a list of prior queries using similar search terms as entered by the user is displayed at step 416. The user is then given the option of selecting a prior query at step 418. Preferably, the user may modify the prior query string by removing or adding search terms and modifiers, or adding new terms and modifiers at step 420. At step 434, the query is recorded in a query string database for use by the search engine. If at step 418 the user does not select a prior query, then the user is again presented with a menu 410 of options.

Alternatively, users may be interested in browsing a wide variety of searches by other users, which option they may select at step 408. Then, at step 416, prior searches by other users are displayed. Such searches are preferably displayed ordered by category and ranked by various criteria, such as query age, subject matter, frequency of use, and user rating. Thus, users may browse prior queries for subjects of topical interest and quickly identify searches of interest to a community of users interested in a particular subject. At step 418, users may select one of the prior queries. If the user selects a prior query, the user optionally modifies the prior query string by removing or adding search terms and modifiers, or adding new terms and modifiers at step 420. At step 434, the query is recorded in a query string database for use by the search engine. If at step 418 the user does not select a prior query, then the user is again presented with a menu of options at step 410.

Figure 5:
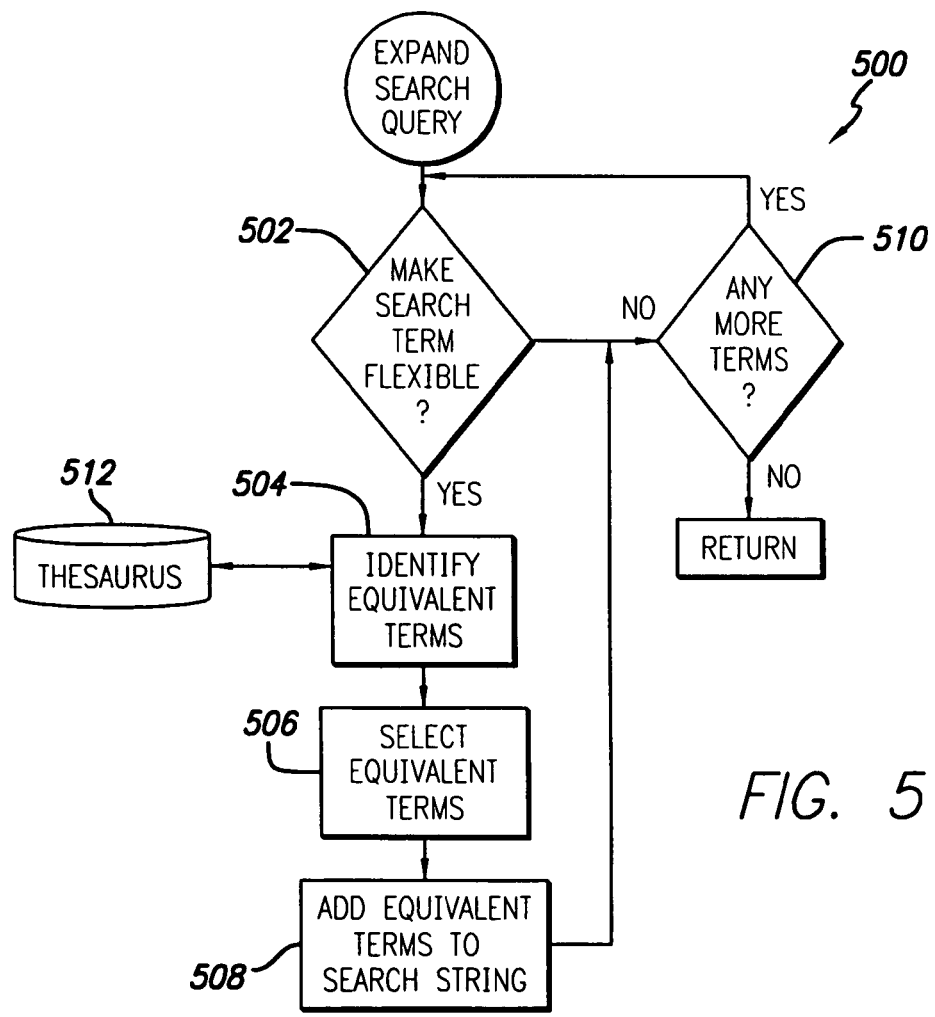
FIG. 5 is a flow chart showing further steps and processes embodied in the search query expansion method, including a process for making a flexible query.

Referring to FIG. 5, a flow chart exemplifies operation of the invention with respect to a search query expansion method 500. In an embodiment of the invention, a query expansion method 500 is provided for adding terms to the query that have meanings equivalent or similar to terms already in the query. For example, if the query included the term 'house,' the query expansion step would provide the user with an option to include the additional terms 'home,' 'domicile,' and 'residence.' A search query with added equivalent terms is referred to herein as a "flexible" query. A query with no added terms is referred to as a "strict" query.

In an embodiment of the invention, method 500 includes steps and processes as described below with respect to in FIG. 5. At step 502, the user is presented with an option to create a flexible query, by finding equivalent or similar terms for any term, or combination of terms, contained in the query. If the user selects to make a particular term flexible, at step 504, a database of equivalent terms, such as found in a thesaurus 512 is consulted and additional term identified. Preferably, the method includes step 506 for presenting the similar terms identified in step 504 to the user. Step 506 is particularly useful if a search term has more than one meaning. In such cases, the search query is more likely to be effective if the user adds additional terms that have meanings equivalent or similar to the intended meaning, and omits terms with contrary meanings. Step 506 provides the user with an opportunity to select only those terms with the intended meaning. Essentially, step 506 allows the user to clarify the intended query meaning. Often, a user will not be aware that a particular term has more than one meaning, thus adding ambiguity to the query. By virtue of identifying equivalent terms to the user, the query expansion method makes it possible for a user to correct unrealized ambiguities in the search query. It should be appreciated that the present expansion method should not be confused with identifying and expanding on word roots, which is known in the art. Root expansion serves a completely different purpose from term expansion according to the present invention, and unlike the present invention, cannot be used to clarify an ambiguous search query.

At step 508, the terms selected in step 506 are added to the search query. Step 510 provides an opportunity to identify equivalent terms for other search terms in the query string, and steps 502-508 may be repeated for as many search terms as desired by the user.

Figure 6:
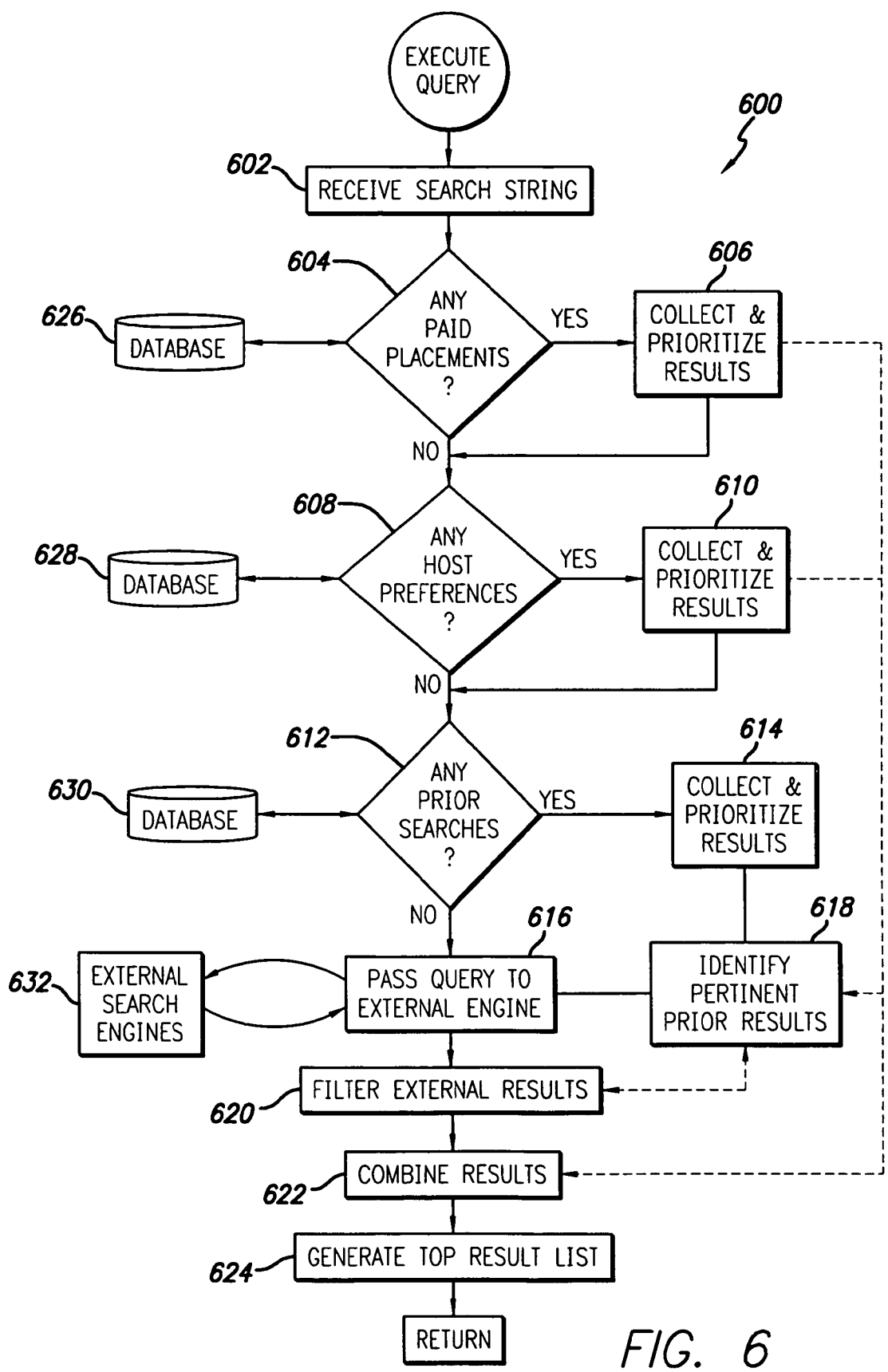
FIG. 6 is a flow chart showing further steps and processes embodied in the search query execution method, including processes for providing paid placements, host preferences, and user evaluation data, and for combining search results.

Referring now to FIG. 6, a flow chart exemplifies operation of the invention with respect to a search query execution method 600. In an embodiment of the invention, method 600 includes steps and processes as diagrammed in FIG. 6. At step 602, a query string is received. At step 604, a step is provided for identifying Web pages for which a subscriber has paid to be returned by search queries having particular terms, referred to as "paid placement." Paid placement provides a way to generate revenue to offset the costs of operating a search site, and in this way it benefits site users. To an advertiser, paid placement provides a way to do targeted advertising with a high likelihood of being read by the recipient. That is, by entering a particular query, the recipient has signaled an interest in reading material about a particular topic, perhaps including an interest in informative advertising and/or offers to sell related products or services.

It is preferable to include paid placements in a way that does not erode user confidence in the search interface. The present invention provides a method for maintaining the objectivity of the search results, and thus maintaining user confidence, while at the same time providing for inclusion of paid placements in the search results. The method of the present invention preferably assigns a ranking weight to paid placements so that they will appear only in those search results to which they are relevant, albeit with a higher ranking than if they were not a paid placement. For example, a paid placement comprising a home Web page for an on-line music store would be ranked higher than competitor's Web pages (that are not paid placements) in a results list for the query "on-line music stores." However, in a query for information about a specific musical artist or title, the same paid placement would be ranked lower than other pages having more specific and focused information concerning the query subject, if the paid placement had no specific information relevant to the query except for offering the artist's titles for sale. This second example shows how whether or not a result is a paid placement is weighed as only one factor among many for ranking purposes. Although not always placed at the top of the results lists, the advertiser could be assured of appropriate placement in results from all relevant queries run on the search interface, and user confidence in the search interface is maintained.

At step 604, database 626 containing information about paid placements linked to various search terms is queried using search terms within a user query. Database 626 is maintained with current information about each paid placement, including the search words, user profiles, time of search, and/or other criteria that the advertiser desires to link to each particular paid Web page placement. Database 626 further contains information about each linked Web page, including its URL and a summary of information accessible through the URL. Paid placements relating to the query are collected, weighted, and ranked at step 606. Various criteria may be used to accomplish weighting and ranking. For example, weights can be based on the identity of the advertiser or the price paid for the placement, on how closely the search query matches the terms targeted by a paid placement, or on how closely the user profile meets the targeted profile of a paid placement. In an embodiment of the invention, paid placements are listed in a separate category. Alternatively, paid placements may be interspersed and combined with other search results, which may include host preferences, user preferences, and Web index search results.

In another embodiment, exemplified by steps 608 and 610, the query execution method 600 includes a process for identifying Web pages that a host desires to be returned by search queries having particular terms, referred to as "host preferences." Host preferences provide a way for the web host to take advantage of the benefits provided by paid placement. For example, the host may want to offer certain products or services for sale using host preferences, and in this way defray the cost of hosting the search site.

At step 608, database 628 containing information about host preferences linked to various search terms is queried using search terms within a user query. Database 626 is maintained with current information about each host preference, in a similar fashion to the database 626 of paid placements described above. Host preferences relating to the query are collected, weighted, and ranked at step 610. Various criteria may be used to accomplish weighting and ranking. For example, weights can be based on the time of search, user profile, site quality, and/or keyword match. In an embodiment of the invention, host preferences are listed in a separate category. Alternatively, host preferences may be interspersed and combined with other search results, which may include paid placements, user preferences, and Web index search results.

In another embodiment, exemplified by steps 616 and 618, the query execution method 600 includes a process for using user evaluation data from previous search query results to identify sites that should be included or removed from a current search executed using the same or similar query. This provides a user with the benefit of the experience of past users of the query, and past system data concerning the query results. User evaluation data is collected, processed, and stored in database 630, using an information collection process tied to search results. Information about highly scored prior search results, such as Web page URL's and a summary of information accessible through each Web page, is also stored in database 630 linked to the user evaluation data. User evaluation data includes user opinions, passive user data, and system data concerning search results. A method for collecting user evaluation data is exemplified by flow chart steps on FIGS. 8 and 13, discussed below.

At step 612, database 630 containing user evaluation data about prior search results is queried using search terms within a user query. Prior search results that match terms in the current user query, and have user evaluation data that shows the Web site or page contains useful information and/or passes various thresholds for acceptance, are collected, weighted, ranked at step 614. In an embodiment of the invention, the system uses evaluation data to block particular search results; for example, the system might block results that frequently appear for particular searches, but for which user evaluation data shows are irrelevant, offensive, or unresponsive. Alternatively, or in combination with ranking or blocking prior search results, various qualities of prior search results, such as relevance to the search, Web page quality, ease of use, and responsiveness, are made visible to the current user.

The query method 600 further includes a process, exemplified by steps 616 through 625 on FIG. 6, for executing the selected search query, or set of queries, on one or more search engines; collecting the search results; combining the search results with any paid placements, host preferences, or prior recommended results; removing any duplicate results; and generating a top results list. At step 616, a query string is preferably passed to one or more external search engines 632 that return a list of query hits. Various search engines are publicly available on the Internet, for example, through the Web sites yahoo.com, excite.com, altavista.com, and hotbot.com. Instead of or in addition to external, publicly available search engines, the query string may also be passed to a dedicated search engine, which may reside on the primary search server 112 or to another server connected to the primary server 112. At step 620, results that were identified in step 618 as undesirable are removed from the results returned by the search engine or engines. At step 622, the remaining search engine results are combined with the paid placements, host preferences, and prior ranked results. Various rules are applied to rank the combined results list. For example, all paid placements, host preferences, and prior results may be ranked higher than results returned from search engines, and search engine results could be ranked separately using various methods. For example, search engine results from two search engines could be ranked by taking the first result. from the first engine and ranking it first; the first result from the second engine, and ranking it second; the second result from the first engine, and ranking it third; the second result from the second engine, and ranking it fourth; and so forth continuing in sequence until all search engine results have been ranked. In the alternative, various search engines could be assigned a quality weighting that is used in association with the search engines' own rankings, so that engines known to generate higher-quality results would receive priority in the rankings. Employing various ranking rules, in step 622, a ranked results list is created that combines all applicable search results.

At step 624, a top results list is preferably generated by removing duplicate results. Then, in the same step, lower-ranked results in excess of a certain number of results are preferably removed by truncating the results list. The number of results to retain in the results list can be a pre-set amount, or can be determinable by the user. For example, if a user specifies that no more than 100 results should be retained, results ranked $101^{st}$ and below would be removed from the top results list. In an alternative embodiment, a portion of the removed results are retained in a system memory, in case subsequent operations as described below cause the results list to become shorter than a given length. In such case, a portion of the removed results can be added back, and the top results list can be reprocessed. This process can be repeated until a results list of desired length is obtained.

Figure 7:
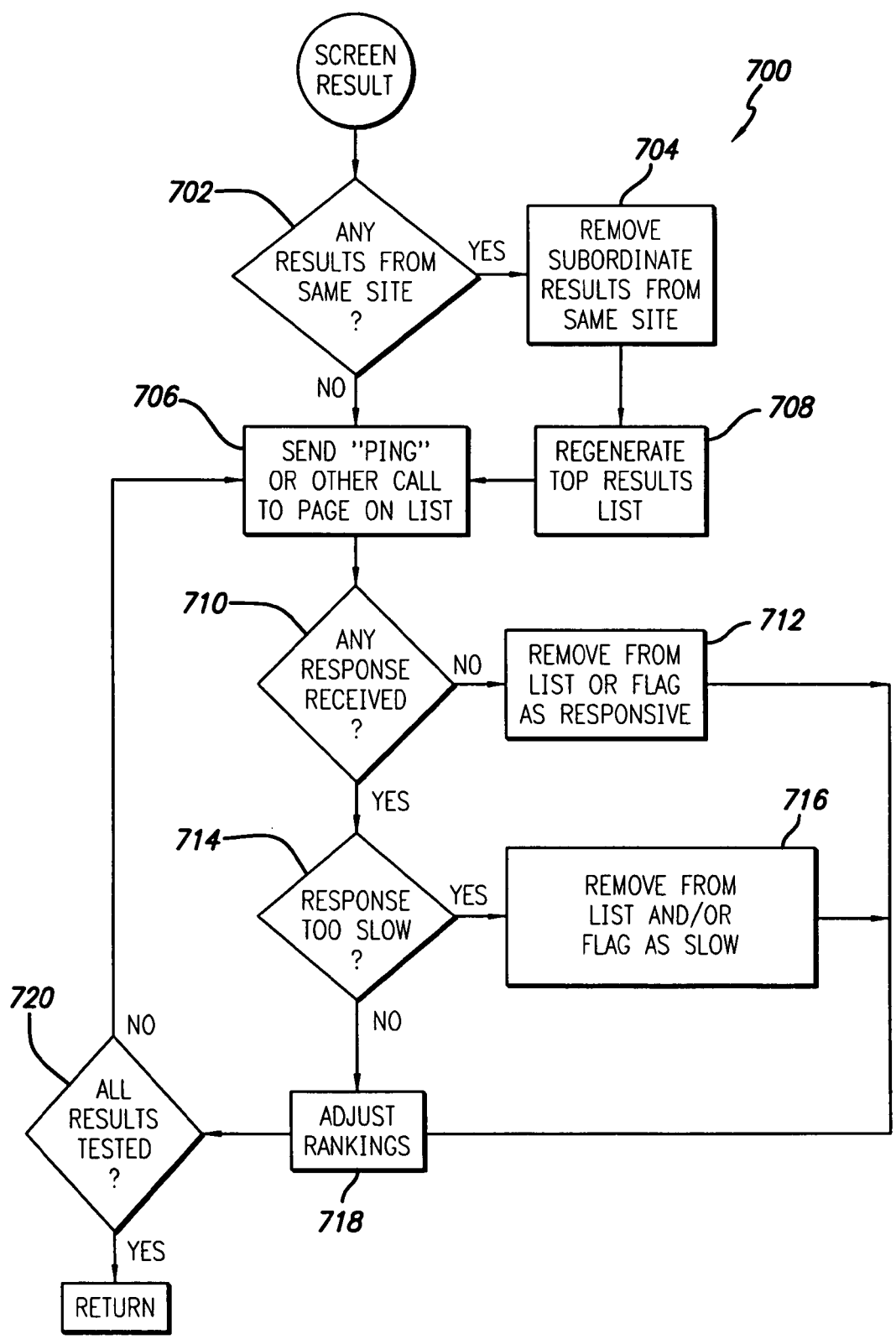
FIG. 7 is a flow chart showing further steps and processes embodied in the results screening method, including processes for removing subordinate results and for testing Web pages that appear on a search result.

Referring to FIG. 7, a flow chart exemplifies operation of the invention with respect to a results screening and ranking method 700. In an embodiment of the invention, method 700 includes steps and processes as diagrammed in FIG. 7. In one embodiment, steps 702 and 704 provide a process for removing subordinate pages from the top results list generated in step 624. A subordinate page is a Web page on the same Web site as a higher-level Web page, wherein the subordinate page may be accessed by following one or more links on, or a chain of links originating on, the higher-level page. Typically, higher-level pages are designed to serve as a portal or access page for a set of subordinate pages on the same Web site. Thus, removing subordinate pages is a way of removing essentially duplicate and unnecessary results, while retaining the higher-level result. This reduces clutter in a search result and makes it easier to identify useful Web pages. In step 702, subordinate results are identified using various methods.

For example, the URL's for a set of pages in a domain may be parsed to identify the page which is closest to the root domain, i.e., the page in a domain with the shortest URL. This page is then deemed the highest level page and all other linked pages are deemed subordinate to it. This method requires minimal system resources, but is not always accurate, depending on the organization of pages within a domain. Also, the URL method cannot determine subordinate pages in a set of pages including more than one domain. An alternate and more accurate method is to employ a mapping function, similar to the mapping function described below, that analyzes the relationship between linked Web pages. By tracing links between a set of linked pages, it is possible to determine which page appears first in a chain of links through which all of the remaining linked pages can be accessed. The mapping method, however, requires more system resources than the URL method. One skilled in the art may devise alternate methods for determining subordinate pages, and any suitable method may be employed within the scope of the present invention.

After subordinate pages have been determined using a selected method, in step 704, subordinate results from the same Web site are removed from the results list, leaving only the highest-level page. Subordinate pages from other Web sites are preferably not removed. The number of removed subordinate links is preferably recorded for use as a criteria in ranking, because the likelihood that a page will provide a link to relevant information increases as more subordinate pages for the page appear on the same search result. In step 708, the top results list is regenerated. To maintain the length of the results list, previously truncated results are preferably restored at step 708, and steps 702 and 704 are repeated.

In another embodiment, the results screening and ranking step includes a process for testing Web pages that appear on a search result, and removing or flagging pages which are unresponsive or slow to respond. At step 706, the system tests each result by "pinging" the server on which each page is located. In addition to or instead of pinging, the system may test each result by sending a short message requesting a response (i.e., a "call"), to each Web site hosting a page listed on the results list. The response request may comprise, for example, a request for the return of a page header. If no response is received, the page may no longer exist or the server may not be responding. At step 710, the system waits for and records the time of response from each server, for a set period of time comprising a maximum acceptable response time. Pages that generate no response at all are removed from the results list, or flagged as unresponsive, at step 712. At step 714, pages that generate a response within the maximum acceptable time, but not within a second, shorter period or desired response time, are identified as slow pages. At step 716, slow pages are flagged as slow, or removed from the results list. At step 718, the ranking of the results is preferably adjusted to reflect the site response times, for example, the ranking of pages that generated quick responses are adjusted upwards. As indicated at step 720, the process is preferably repeated until all the results have been tested in like manner. The page testing process prevents users from wasting time attempting to load Web pages that are obsolete, located on Web sites with unresponsive or slow servers, or otherwise restricted. Users are then free to spend more time evaluating pages that are more readily accessible.

Figure 8:
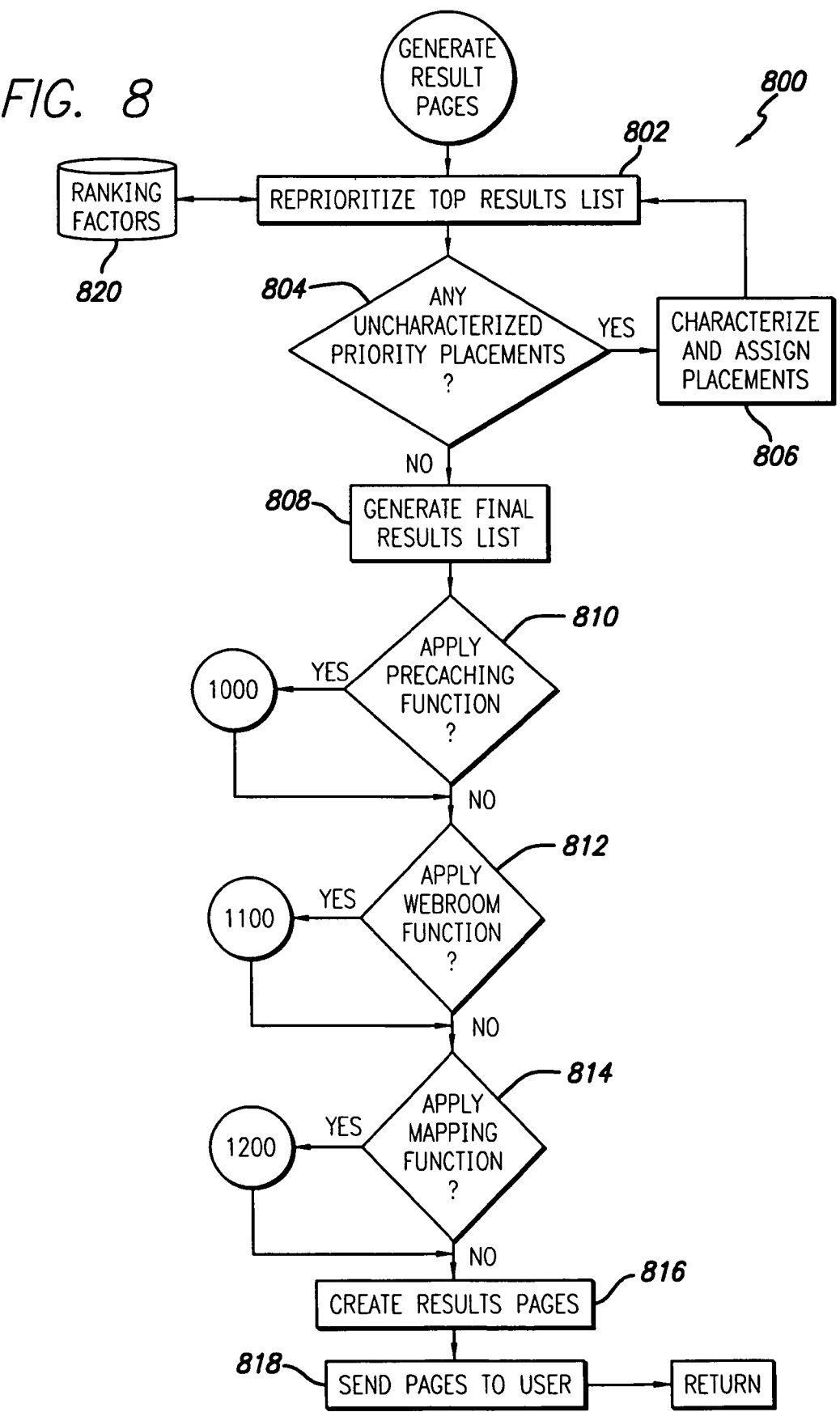
FIG. 8 is a flow chart showing further steps and processes embodied in the results pages generation method, including a pre-caching process, a Webroom process, and a mapping process.

Referring now to FIG. 8, a flow chart exemplifies operation of the invention with respect to a results page generation method 800. In an embodiment of the invention, method 800 includes steps and processes as diagrammed in FIG. 8. In one embodiment, the present invention provides steps 802-806 comprising a process for ranking search results by applying a set of ranking factors, including, for example, paid placement, host preferences, page response time, order received from search engine, identity of search engine, and user evaluation data. The ranking process is used to ensure that the higher-ranked and most useful pages receive more prominent placement in any search result pages viewed by the user. Such ranking criteria may be applied at various times during the overall process of the invention, and at more than one time. At step 802, the results list is preferably ranked again according to various ranking factors that have been previously described. Step 802 helps to ensure that previously applied factors are applied uniformly to all the results, and may also be used to incorporate ranking factors that have not yet been applied. Similarly, steps 804 and 806 ensure that no high priority results, such as paid placements, have been inadvertently removed; in the alternative, the system adds certain high priority results for the first time at steps 804 and 806. At step 804, any unplaced priority results are identified; step 806, any missing high priority results are assigned an appropriate ranking and added to an appropriate portion of the results list. If necessary, the list is re-ranked again at step 802, and a final results list is generated at step 808 using the final ranked results. The results are now ready for application of further processes designed to enhance the usefulness of the search and capture user evaluation data, as described below.

Figure 10:
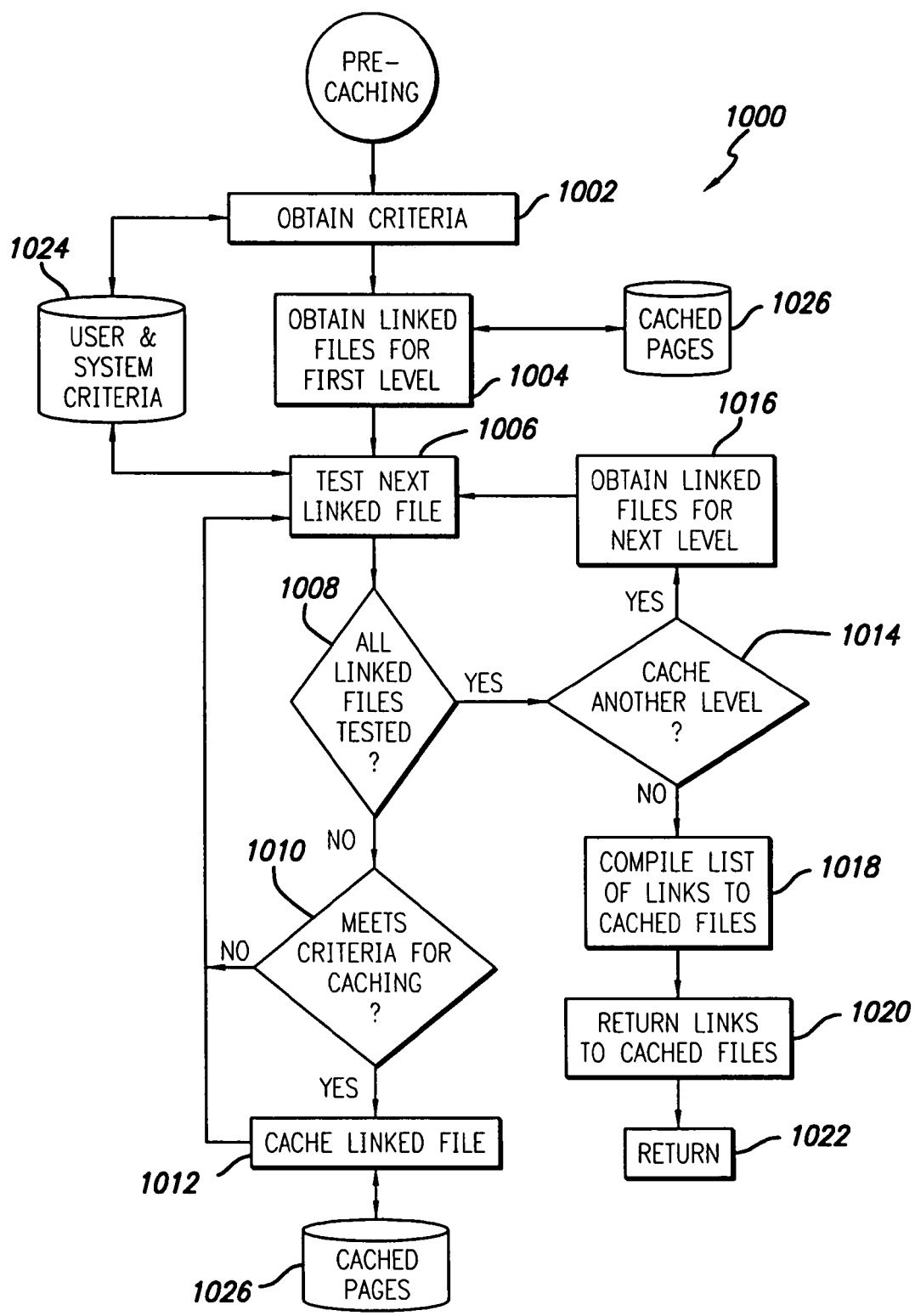
FIG. 10 is a flow chart showing further steps and processes embodied in the pre-caching process.

Referring to FIGS. 8 and 10, flow charts exemplify operation of the invention with respect to a pre-caching method 1000. In an embodiment of the invention, method 1000 provides a pre-caching process for caching Web pages linked to search results pages, before the Web pages are requested by the user, as diagrammed in FIG. 10. Preferably, the pre-caching process uses a set of user-determinable and system-determinable parameters to determine which Web pages to cache, and occurs automatically while the user is occupied with other tasks. At step 1002, user criteria for performing pre-caching are obtained from database 1024. Alternatively, at step 1002, the user is preferably given the option to specify new criteria, or to adopt the default system criteria. Pre-caching criteria include, for example, the number of link levels to cache; the maximum file size to cache; the maximum time allowed for caching; the number of results to cache and/or particular results to include or to exclude; and the location where pre-cached files are to be stored. User criteria can be overridden by system criteria, for example, users' can be prevented from caching files greater than a certain size. The pre-caching process enables the user to view the pages returned by a search result more quickly, particularly when a network server with a fast network connection is employed to perform the caching. In other situations, the user may prefer to store cached pages on a user computer, such as a laptop computer, for browsing offline, for example, when traveling on an airplane.

At step 1004, Web-crawling or "spider" software is employed to obtain the Web pages listed on the results list and otherwise meeting the criteria for caching. Such Web pages are stored in database 1026. At step 1006, the links to other Web pages on the cached pages are identified. At step 1008, the software determines whether all links on the current page level have been tested against the caching criteria. If not, the links identified in step 1006 are tested against the caching criteria. Any Web pages for links meeting the criteria are cached at step 1012 and stored in database 1026. When all links at a given level have been tested, as determined at step 1008, the process is repeated for the next level, as indicated at steps 1014 and 1016. Steps 1006-1016 are repeated until all files meeting the criteria for caching have been cached. In the alternative, limits can be placed on the allowable size of database 1026 or on the time allowed for the caching operation, to interrupt the caching process if any limit is exceeded.

After all pages to be cached have been stored in database 1026, a list of the cached pages is generated at step 1018. The list of cached pages is also stored in database 1026 or other location, and appropriate pointer or address is returned to the system at step 1020, completing the pre-caching process as indicated at step 1022.

Figure 11:
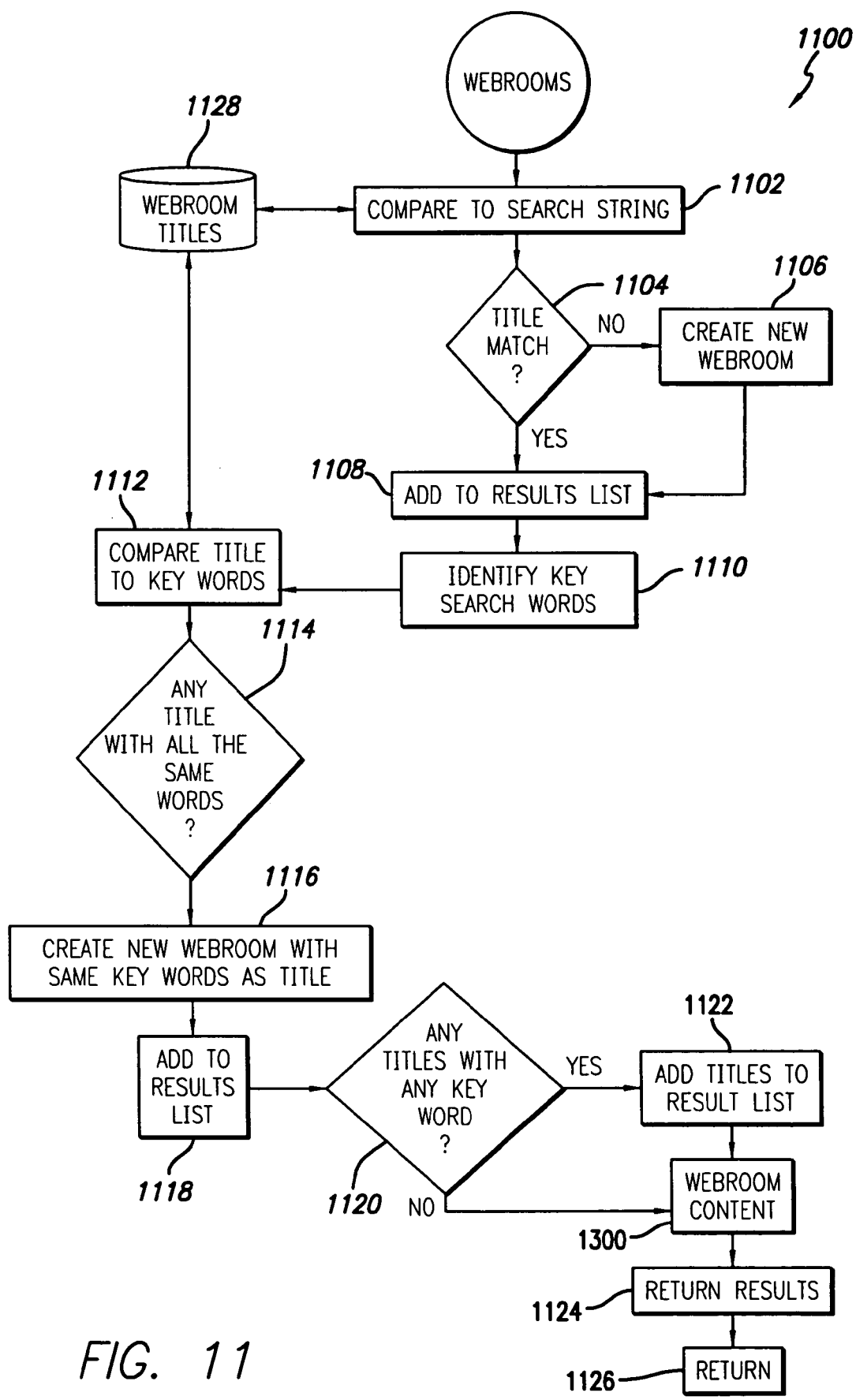
FIG. 11 is a flow chart showing further steps and processes embodied in the Webroom process.

Referring to FIGS. 8 and 11, flow charts exemplify operation of the invention with respect to a Webroom search method 1100. In an embodiment of the invention, method 1100 provides a process for providing links to a set of related Webrooms, or other information exchange group, as diagrammed in FIG. 11. A Webroom is an information exchange group, further described in the co-pending application entitled "A Method, Apparatus and System for Hosting Information Exchange Groups on a Wide Area Network" referenced above. A Webroom provides a convenient and highly interactive way for multiple users to exchange information over a wide area network. The process for providing links to related Webrooms provides users with an additional source of topic-specific information and the opportunity to interact with other users interested in the topic.

At steps 1102 and 1104, the query string is compared with Webroom titles stored in database 1128. At step 1106, a new Webroom is created on a Webroom server if no matching title is identified in step 1108. If a title match is identified at step 1108, the Webroom with a title matching the query string is added to the results list. At step 1110, the keywords in the query string' are identified by removing operators such as OR and AND, and common words such as "the" and "a." Preferably, derivative forms, such as plural forms, are reduced to their root form. At steps 1112 and 1114, the keywords extracted from the query string at step 1110 are compared to the database of Webroom titles 1128. If no Webroom is found with all of the keywords in its title, in any order, a new Webroom is created with all of the keywords in its title. Preferably, the new Webroom is linked to the Webroom created at step 1106 or to the Webroom identified at step 1108 as an exact title match. At step 1118, any Webroom in database 1128 containing all of the same keywords as the query string is added to the results list. At steps 1120 and 1122, additional Webrooms in database 1128 having at least one keyword in their title are added to the results list, after which a process 1300, exemplified by the flowchart shown on FIG. 13, is carried out.

Figure 13:
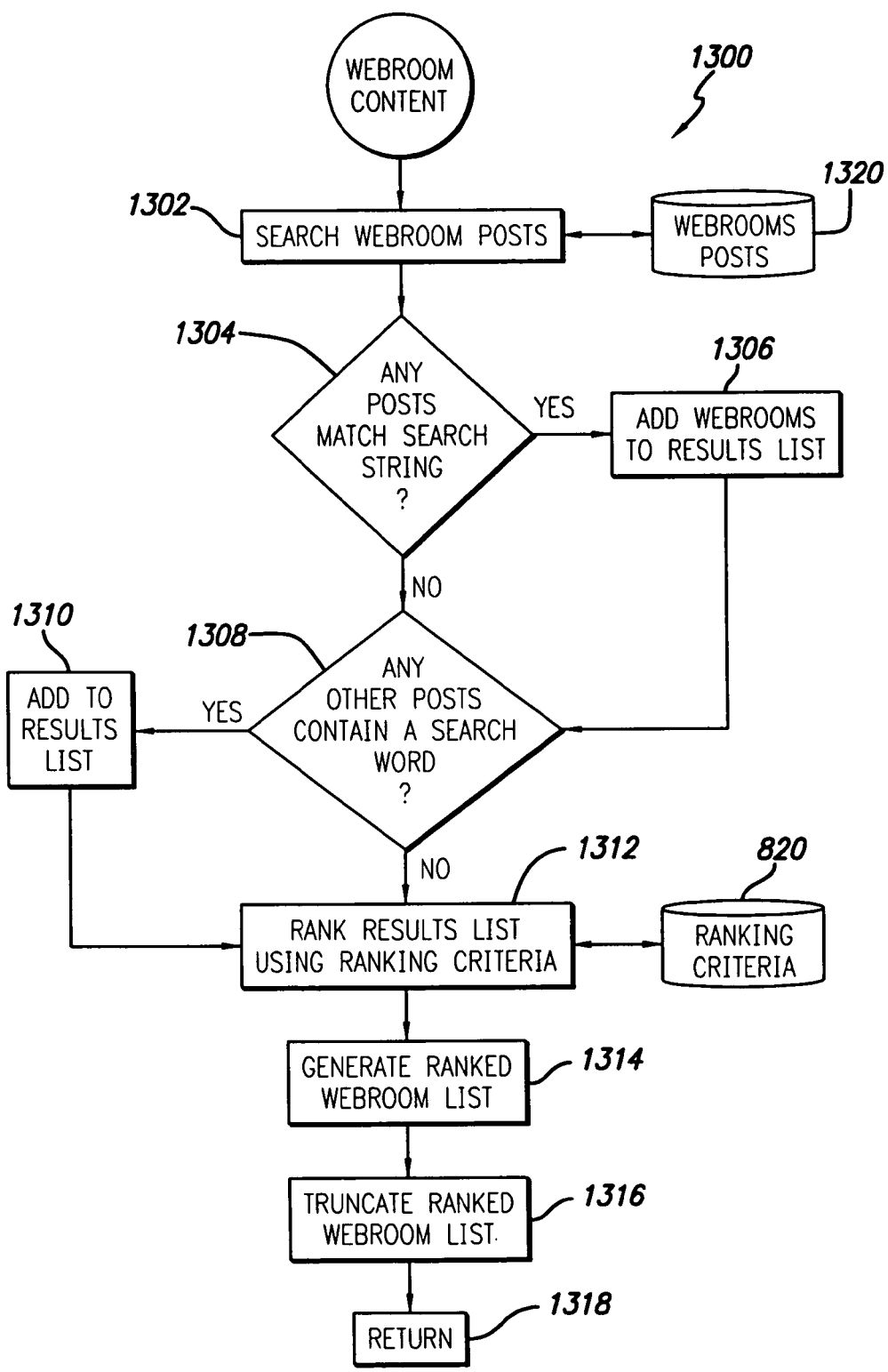
FIG. 13 is a flow chart which is a continuation of FIG. 11, showing further steps and processes embodied in the Webroom process.

Referring to FIGS. 11 and 13, at step 1302, a database 1320 of Webroom content, such as user posts, is searched using the query string and keyword list from step 1110. At steps 1304 and 1306, any Webrooms with a post matching the query string are added to the results list. At steps 1308 and 1310, any Webrooms with a post matching any word in the keyword list are added to the results list. At step 1312, the Webrooms identified in the above searches are ranked according to ranking criteria, for example, the ranking criteria in database 820, which may be the same as database 820 on FIG. 8. Alternatively, or in addition to ranking criteria in database 820, other criteria may be used; for example, the following criteria: (a) number of words in Webroom title or post that match a keyword, (b) order of words in Webroom title or post, (c) number of non-matching words in Webroom title, (d) age, size, user or system evaluation scores, number of participants, and similar Webroom indicators. At step 1314, a ranked Webroom list is generated from applicable criteria. At step 1316, the Webroom results list is truncated if it exceeds a certain pre-determined size, to create a final Webroom list. The final Webroom list is returned at steps 1318 and 1124, completing the Webroom search process as indicated at step 1126.

It should be appreciated that the foregoing method of searching Webrooms may be adapted for searching other information exchange groups on the Web, such as message boards and chat rooms. However, Webroom searching is preferred, because Webrooms have unique features that provide more relevant and useful topical information, as described in more detail in the co-pending application referenced above.

Figure 12:
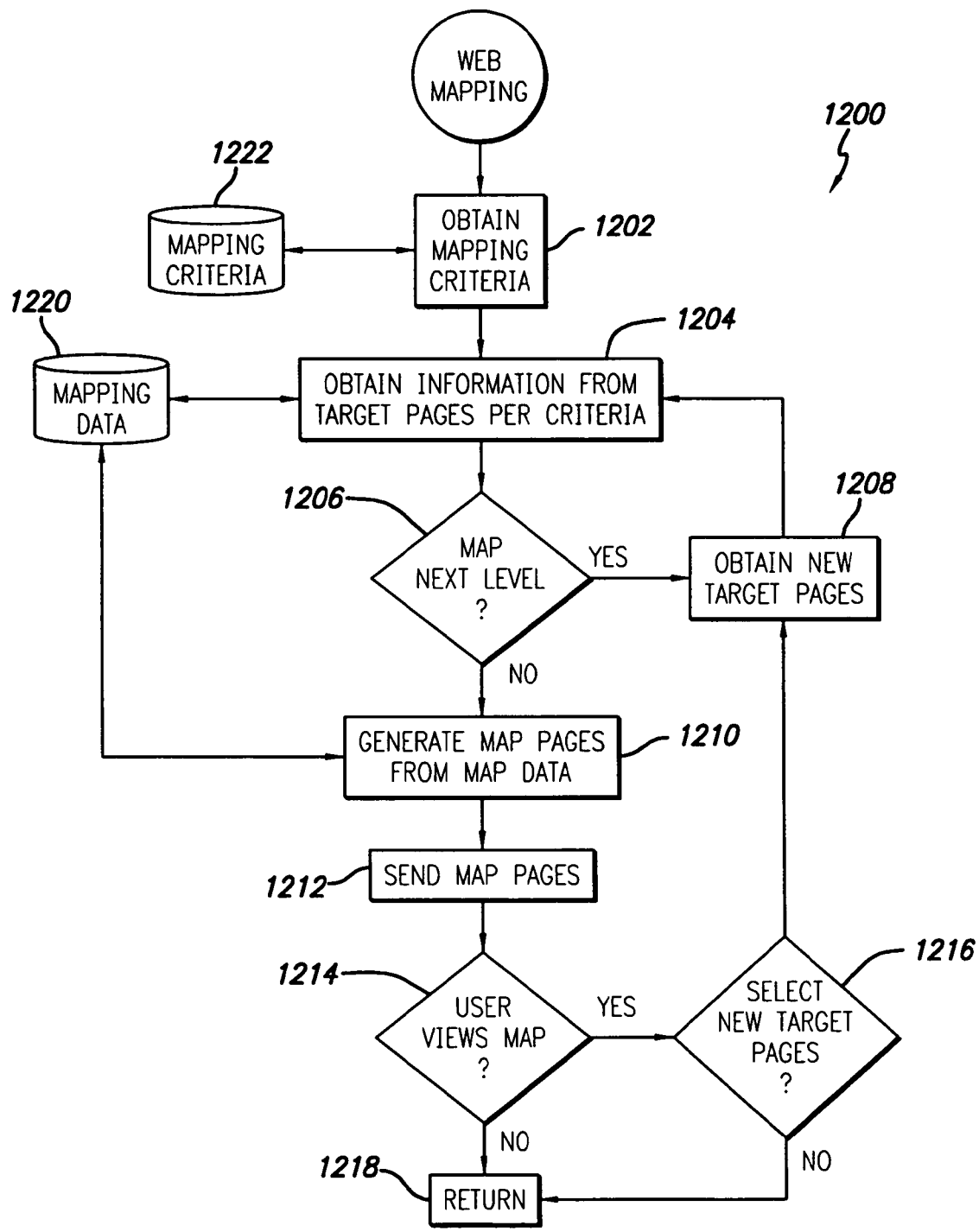
FIG. 12 is a flow chart showing further steps and processes embodied the mapping process.

Referring to FIGS. 8 and 12, flow charts exemplify operation of the invention with respect to a Web mapping method 1200. In an embodiment of the invention, method 1200 provides a process for providing a set of Web maps for Web pages identified in the search results, as diagrammed in FIG. 12. A Web map is a Web page that contains summary information about the content and hyperlinks found on a target Web page and on other Web pages linked to the target page, and pages linked to those pages, and so forth. Web maps are further described in the co-pending application entitled "Method and Apparatus for Mapping a Site Page on a Wide Area Network" referenced above. At step 1202, mapping criteria are obtained from database 1222. Similarly to the pre-caching criteria described above in connection with step 1002, and mapping criteria include the number of linked levels to map, and preferably includes secondary criteria such as the allowable time for mapping, number of results to map, amount and type of page content to include on maps, desired map format, and so forth. At step 1204, the pages targeted for mapping are identified using the criteria from step 1202, and map information is extracted from the targeted pages accordingly and stored in database 1220. If the targeted pages have already been pre-cached, it is preferable to access them by using database 1024, shown on FIG. 10. If the pages have not been precached, they are collected and processed using web-crawling software in a manner similar to that described in connection with the pre-caching process. At step 1206, the map criteria is checked against the current mapped level to determine if another linked level should be mapped. If yes, step 1204 is repeated; conversely, if no, the map data collection cycle ends. At step 1210, representative maps are generated for each result for which mapping data has been collected, showing the relationship of the mapped page to any subordinate pages, and including a summary of page content, page links, and linked page content. Additional information concerning the generation and form of Web maps is provided in the co-pending U.S. patent application referenced above.

At step 1212, map pages are sent to the user, preferably along with other search results at step 818 shown on FIG. 8. However, the sending step is also shown on FIG. 12 to show how a user may interact with maps using the present invention, as exemplified by steps 1214 and 1216. Search result pages sent to a user preferably contain links to maps of result pages, accessible by a pull-down menu, by a button or other clickable icon next to each result, on an adjacent frame of a result page or similar device. At step 1214, a user selects and views a map. At step 1216, a user identifies a linked page from the viewed map, and requests that a second map be generated for this linked page. The viewed map is preferably interactive, so that the user may request the second map by pointing a computer cursor to the desired link, and issuing a command, for example, by selecting a command from a pop-up or pull-down menu. If a user selects to map a new target page or pages, the new targets are mapped as exemplified by steps 1204-1214, described above. After the web maps have been generated, and no additional maps are requested by the user, the mapping cycle ends as indicated at step 1218.

Referring to FIG. 8, step 816, after completion of the pre-caching and Webroom search processes, and a first iteration of the mapping process, one or more result pages are generated. Result pages preferably include information from the final results list, pre-cached page list, Webroom result list, and Web maps. Results are preferably summarized on lists which appear in pull-down menus, pop-up menus, frames, or similar graphical devices. Lists are preferably interactive, to provide links to relevant pages, either pre-cached or as residing on their respective Web sites, to Web maps, and to Webroom results, and to other summaries of the relevant page's information content. Preferably, result pages can be saved at the user's option on the primary search server or other network location, for convenient reference by the user from any computer or terminal device connected to the network. At step 818, the result pages are sent to the user for viewing, and integration of user data.

Figure 9:
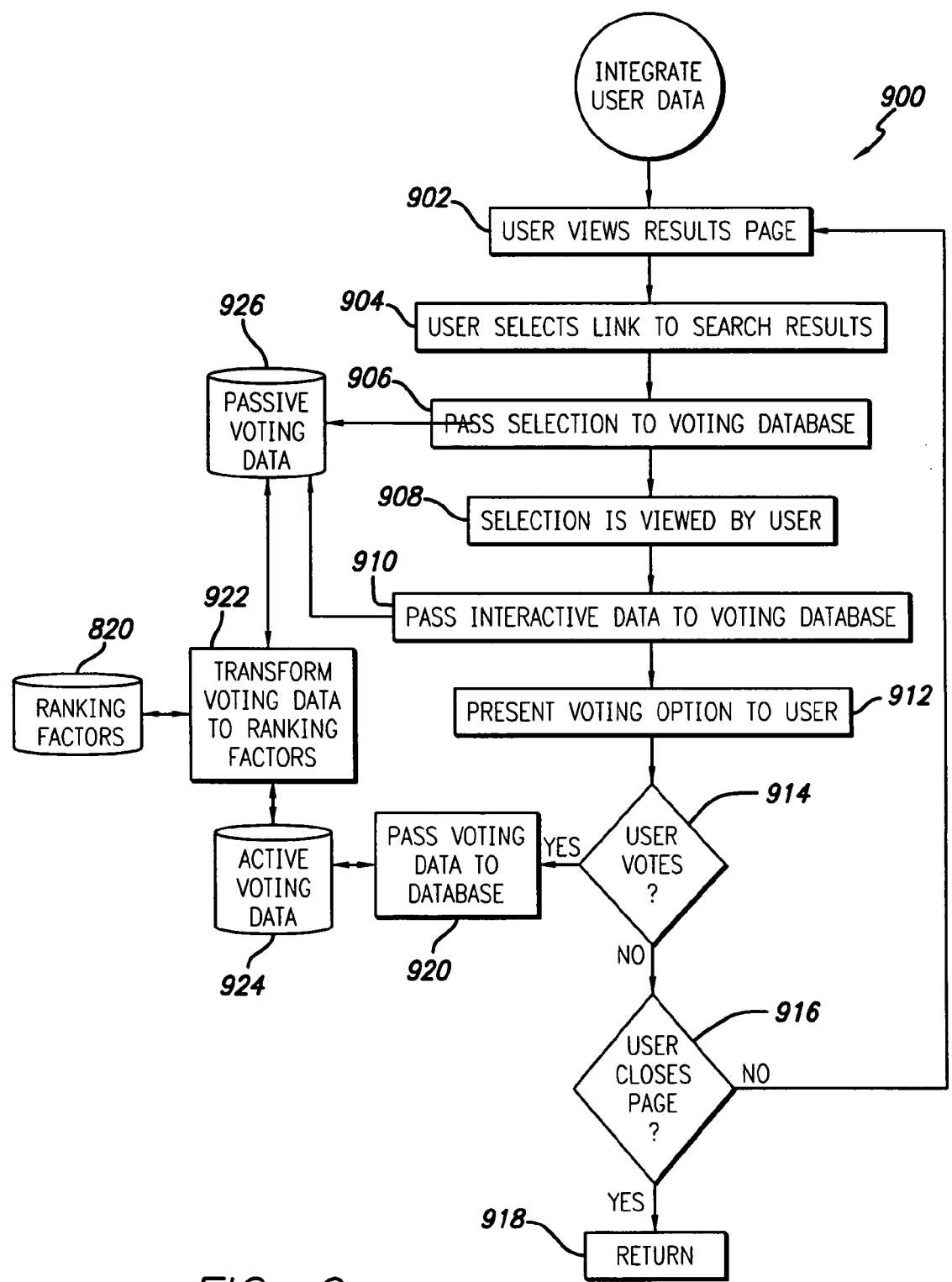
FIG. 9 is a flow chart showing further steps and processes embodied in the user data integration method.

Referring to FIG. 9, a flow chart exemplifies operation of the invention with respect to a user data integration method 900. In an embodiment of the invention, method 900 includes a process for recording user evaluation of the content and usefulness of the Web pages provided by a search, as diagrammed in FIG. 9. At step 902, a user views a result page. At step 904, the user selects a link to a result page, which may be pre-cached by the primary search server, or residing on its regular Internet Web site. At step 906, the user's selection is passed to a database 926 containing passive voting data. All the time that the user is viewing the search result, use data, such as number of keystrokes or mouse clicks, length of time the result window is open, number and location of links that are followed from each page, and quantity of downloaded or uploaded data, is automatically collected at step 910 and stored in database 926. Preferably, such use data is collected with the user's consent, with appropriate privacy safeguards. For example, use data collected for statistical purposes can be stripped of any data identifying the user before it is stored in database 926.

In one embodiment, exemplified at steps 912-922, user evaluation data is collected using the result pages, and integrated into the system database for future use. At step 912, a voting option is presented to a user with an interactive device linked to a search result, such as a "vote" button, or series of vote buttons, on a results screen. Alternatively, a scoring option appears on a pop-up window when a result page is viewed. The user is presented with the option of scoring various parameters, for example, relevance of a result to the search query could be ranked on a scale of zero to ten. Other parameters that may be scored include quality of a site, depth of information, format and organization, ease of use, and so forth. Alternatively, users could be given the option of providing a simple good/bad, yes/no ranking of one or more parameters. It is preferable to include rewards and other motivation for users to spend time providing candid and thoughtful reviews of search results. For example, discounts applicable towards merchandise sold by site sponsors may be provided in exchange for various user evaluation responses. Users who contribute more result reviews could be recognized as experts and given preferred access to system resources. Additional ways of motivating users to provide interactive data are described in the co-pending U.S. patent application pertaining to Webrooms, referenced above.

If the user votes at step 914, the voting data is stored in an active voting database 924 at step 920. At various times, preferably, as part of regular system maintenance, active voting data in database 924, and passive voting data in database 926, are analyzed at step 922, wherein a set of ranking factors are generated. Rankings can be weighted by average numeric scores of user ratings, by the number of user ratings, by the number of positive or negative ratings, and so forth, in various combinations. Ranking factors from user data are stored in database 820, shown on FIGS. 8 and 9, for general use in ranking search results as described above. User data in databases 924 and 926 is also preferably viewable by users, for example, a link to user data can be provided with each result on a results list, or on maps of result pages. By accessing such user data, creators of Web page content can gauge the effectiveness of their pages and gain valuable feedback for improving them.

At step 916, if a user chooses to continue viewing the results page, the method 900 may be repeated for the next link on the results page. If the user is finished, the user closes the result page and returns at step 918. Method 900 may then be repeated for another result page when selected by the user.

In general, many of the exemplary processes described above make use of user-provided data concerning the system, such as search query effectiveness and the relative usefulness and relevance of particular Web sites and Web pages. Also, many of the processes exemplify the use of performance data that is automatically collected without direct user participation, such as Web site response time. This gathering of user and system data is an important aspect of the present invention. Such processes for collecting data about system performance essentially provide a feedback loop that greatly enhances the performance of the system. Unlike prior art methods, the present invention is able to respond to growth in available data and growth in use by providing more focused and relevant search results. The continuous user and system feedback makes the system perform better as it is used more; and the better the system performs, the more likely it is to be used. Thus, the present invention promotes itself via a network effect, making it useful for any application intended to draw large numbers of users, such as an Internet portal Web site or other electronic commerce site.

Having thus described a preferred embodiment of a method and system for searching a wide area network, it should be apparent to those skilled in the art that certain advantages of the within method and system have been achieved. It should also be appreciated that various modifications, adaptations, and alternative embodiments thereof may be made within the scope and spirit of the present invention. The invention is further defined by the following claims.

What is claimed is:

1. A method comprising:
   a computer system selecting one or more search results responsive to a search query;
   the computer system determining a first ranking of the one or more search results based on user feedback evaluating previous selections of search results for the search query;
   the computer system determining whether at least one of the one or more search results is associated with a paid placement, wherein the determining includes identifying the at least one search result associated with the paid placement; and
   at least partially based on the first ranking and the determining, the computer system providing the one or more search results to a user in a particular order.

2. The method of claim 1, wherein the one or more search results are provided to the user via a web page that is renderable by a web browser of the user, wherein the web page includes links to access web pages associated with the one or more search results, wherein the web page further includes one or more fields selectable by the user to send, to the computer system, feedback evaluating a selection of one or more of the provided search results to the computer system, and wherein the one or more selectable fields are distinct from the links.

3. The method of claim 2, wherein the one or more selectable fields include a button that is selectable by the user to indicate whether a given search result is relevant to the search query.

4. The method of claim 1, wherein the one or more search results are provided to the user via a web page that is renderable by a web browser of the user, wherein the web page includes one or more scoring fields, wherein each scoring field is accessible by the user to input, for a given search result, a numeric value indicative of whether that search result is relevant to the search query.

5. The method of claim 1, wherein the selecting includes:
   determining an initial set of search results based on terms specified in the search query; and
   based on feedback from a plurality of users, selecting a subset of the initial set of search results as the one or more search results to be provided to the user.

6. The method of claim 1, wherein the particular order is further at least partially based on pricing information for the paid placement.

7. A non-transitory computer readable medium having program instructions stored thereon, wherein the program instructions are executable by a computer system to cause the computer system to perform:
   generating a first web page responsive to a search query, wherein the first web page includes search results selected based on the search query and arranged according to a particular order;
   wherein the particular order is at least partially dependent on a first determination of a first ranking based on feedback from a plurality of users evaluating previous selections of search results for the search query and a second determination of whether one or more of the search results correspond to paid placements; and
   receiving feedback from a user evaluating a selection of one or more of the search results for inclusion in the first web page.

8. The non-transitory computer readable medium of claim 7, wherein the first web page includes links to web pages corresponding to the search results, wherein the first web page further includes a feedback field usable to input the feedback from the user, and wherein the feedback field is distinct from the links.

9. The non-transitory computer readable medium of claim 8, wherein the feedback field includes a button selectable to indicate whether a search result is relevant to the search query.

10. The non-transitory computer readable medium of claim 8, wherein the feedback field includes a scoring field accessible to provide a numeric value indicative a relevance of a search result to the search query.

11. The non-transitory computer readable medium of claim 7, wherein the program instructions are executable to further perform:
   based on the received feedback, generating a second web page responsive the search query, wherein the second web page includes different search results from the search results included on the first web page.

12. A method, comprising:
   a client computer system submitting a search query to a server system;
   the client computer system receiving search results selected by the server system based on the search query and arranged in a particular order, wherein the particular order is at least partially dependent on a first determination of a first ranking of search results based on user feedback evaluating previous selections of search results for the search query and a second determination of whether one or more of the search results correspond to paid placements; and the client computer system sending user feedback evaluating the selection of the search results.

13. The method of claim 12, wherein the receiving includes receiving a web page including the search results, and wherein the web page includes one or more feedback fields usable to send the user feedback.

14. The method of claim 13, wherein the one or more feedback fields include a button selectable to indicate that a search result is not relevant to the search query, and wherein the sending includes conveying an indication that the button has been selected.

15. The method of claim 13, wherein the one or more feedback fields include a field that is accessible to input a score indicative of whether one or more search results are relevant to the search query, and wherein the sending includes conveying the score.

16. The method of claim 13, wherein the web page includes a feedback field for each search result included in the web page.

17. The method of claim 12, wherein submitting the search query includes:

submitting an initial search query to the server system;

receiving one or more suggested search queries from the server system; and selecting one of the one or more suggested search queries as the search query to be submitted.

* * * * *